(12) United States Patent
Ito et al.

(10) Patent No.: US 8,477,191 B2
(45) Date of Patent: Jul. 2, 2013

(54) ON-VEHICLE IMAGE PICKUP APPARATUS

(75) Inventors: Haruo Ito, Tokyo (JP); Koichi Abe, Iwaki (JP); Hisatoshi Ishii, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 1002 days.

(21) Appl. No.: 12/247,735

(22) Filed: Oct. 8, 2008

(65) Prior Publication Data
US 2009/0102922 A1  Apr. 23, 2009

(30) Foreign Application Priority Data

Oct. 23, 2007  (JP) .................................. 2007-275483

(51) Int. Cl.
*H04N 7/18* (2006.01)
(52) U.S. Cl.
USPC ......................................... 348/148; 348/118
(58) Field of Classification Search
USPC ................................................. 348/118, 148
See application file for complete search history.

(56) References Cited

U.S. PATENT DOCUMENTS

| | | | |
|---|---|---|---|
| 7,161,616 B1* | 1/2007 | Okamoto et al. | 348/148 |
| 7,277,123 B1* | 10/2007 | Okamoto et al. | 348/148 |
| 2002/0110262 A1 | 8/2002 | Iida et al. | |
| 2002/0175999 A1 | 11/2002 | Mutobe et al. | |
| 2005/0168330 A1* | 8/2005 | Ono et al. | 340/461 |
| 2006/0149429 A1* | 7/2006 | Aizawa | 701/1 |
| 2007/0046450 A1* | 3/2007 | Iwama | 340/436 |
| 2007/0239357 A1 | 10/2007 | Mori et al. | |
| 2009/0102921 A1* | 4/2009 | Ito et al. | 348/148 |
| 2010/0220189 A1 | 9/2010 | Yanagi | |

FOREIGN PATENT DOCUMENTS

| | | |
|---|---|---|
| JP | 03099952 | 4/1991 |
| JP | 08305999 | 11/1996 |
| JP | 3300334 | 4/2002 |
| JP | 2002-316602 | 10/2002 |
| JP | 2002-369185 | 12/2002 |
| JP | 2003-102001 | 4/2003 |
| JP | 2003-346189 | 12/2003 |
| JP | 2004-201223 | 7/2004 |
| JP | 2005-142657 | 6/2005 |
| JP | 2005-319851 | 11/2005 |
| JP | 2007-267343 | 10/2007 |
| WO | WO00/64175 | 10/2000 |
| WO | WO 0064175 | * 10/2000 |
| WO | WO2007/015446 | 2/2007 |

OTHER PUBLICATIONS

U.S. Appl. No. 12/247,717, filed Oct. 8, 2008, Haruo Ito et al.

(Continued)

*Primary Examiner* — Joon H Hwang
*Assistant Examiner* — John Isom
(74) *Attorney, Agent, or Firm* — Brinks Hofer Gilson & Lione

(57) ABSTRACT

Images taken by a plurality of cameras mounted on a vehicle are combined and an image of the surrounding area is developed, in a plane, around a vehicle display portion. The vehicle display portion shows an illustration border line indicative of the outer shape of the vehicle. The outline of the vehicle indicated by the illustration border line is drawn slightly larger than the outer shape of the actual image of the vehicle. This allows margin areas to be formed between the vehicle and its surroundings, thus reducing the possibility of a collision with an obstacle during driving.

18 Claims, 10 Drawing Sheets

OTHER PUBLICATIONS

Notice of Allowance dated Jan. 6, 2012 for U.S. Appl. No. 12/247,717, 16 pgs.

JPO Office Action for JP2007-275483 mailed Jul. 24, 2012, 5 pgs (including English translation).

JPO Office Action for JP2007-275466 mailed Aug. 14, 2012, 5 pgs (including English translation).

* cited by examiner

ON-VEHICLE IMAGE PICKUP APPARATUS

RELATED APPLICATIONS

The present application claims priority to Japanese Patent Application Number 2007-275483, filed Oct. 23, 2007, the entirety of which is hereby incorporated by reference.

BACKGROUND OF THE INVENTION

1. Field of the Invention

The present invention relates to on-vehicle image pickup apparatuses for displaying an image composed of images taken by a plurality of cameras provided on a vehicle, and in particular to an on-vehicle image pickup apparatus in which the boundary between the vehicle and its surrounding area can be recognized easily.

2. Description of the Related Art

Japanese Unexamined Patent Application Publication Nos. 3-99952, 8-305999, and 3300334 disclose on-vehicle image pickup apparatuses including a plurality of cameras provided on a vehicle. The cameras each include a lens for focusing images in a wide space area, such as a fisheye lens, and detect the images focused by the lenses with a photo-detector, such as a charge-coupled device (CCD).

These on-vehicle image pickup apparatuses compose images of the surroundings of a vehicle taken by the plurality of cameras into a top projection view, and display this composite image in combination with an illustration of the vehicle. This view allows the operator to easily recognize the relationship between the vehicle and it surroundings on a screen.

In capturing the boundary between a vehicle and its surroundings with cameras mounted at two or more locations on the vehicle, the boundary can be displayed almost correctly as a composite image when the cameras are spaced apart from the vehicle, such as on door mirrors. However, cameras mounted at the front end and the rear end of the vehicle are slightly recessed from the front end and the rear end toward the center of the vehicle, respectively. This causes part of the front area and rear area of the vehicle adjacent to the center to be hidden when the front and rear are viewed from the cameras. This makes it impossible to obtain images of the areas close to the front end and rear end of the vehicle even if images taken by the cameras are combined.

Thus, the on-vehicle image pickup apparatus described in Japanese Unexamined Patent Application Publication No. 3300334 processes areas in the surroundings close to the vehicle which cannot be captured as images, for example, to fill the areas with a specific color to indicate dead areas or caution areas.

Such conventional displays, in which the image of the surroundings projected to a plane and the illustration of the vehicle are combined, generally express the outline of the illustration of the vehicle substantially in agreement with the actual outline of the vehicle. This may cause the drivers to make a mistake in measuring the distance between the outline of the illustration of the vehicle displayed on the screen and an obstacle. This may cause the drivers to judge incorrectly that there is enough distance between the illustration of the vehicle and the image of the obstacle on the screen, and thus drive the vehicle abnormally close to the obstacle.

While driving on an inclined road or an extremely rough road, vehicles may bounce to cause the outer ends of the vehicle to roll to the right and left greatly. This may cause the vehicle to collide with obstacles on either side of the road. However, the driver can hardly avoid approaching the obstacles due to the rolling of the vehicle when driving while viewing the illustration of the vehicle displayed on the screen.

If the dead area or caution area is filled with a specific color as in Japanese Unexamined Patent Application Publication No. 3300334, the operator who views the display screen cannot intuitively understand what the filled portion indicates, that is, whether the filled portion indicates part of the vehicle or the ground or the like. This makes it difficult for the operator to grasp the position of the outer periphery of the vehicle.

SUMMARY OF THE INVENTION

The present invention is made to solve the above problems. Accordingly, it is an object of the invention to provide an on-vehicle image pickup apparatus capable of combining images of the surroundings of a vehicle taken by a plurality of cameras and displaying the composite image together with an illustration of the vehicle to facilitate determination of the distance between the vehicle and obstacles.

According to a first embodiment of the invention, there is provided an on-vehicle image pickup apparatus including a plurality of cameras disposed at a plurality of positions on a vehicle; an image processing section that processes images taken by the plurality of cameras; and a display device that displays the images processed by the image processing section. The cameras each have a lens capable of focusing the light of an image in a wide-angle space area and an optical-detector that detects the lights focused by the lens. The image processing section performs the process of combining the images of the surroundings of the vehicle taken by the cameras; the process of displaying an illustration border line indicative of the outer shape of the vehicle in a vehicle display portion on a screen; and the process of displaying the illustration border line in such a manner that a no-image portion in which the image of the surroundings close to the vehicle is not shown is included in the area enclosed by the illustration border line.

The on-vehicle image pickup apparatus of the embodiment projects the images of the surroundings of the vehicle taken by the cameras onto plane coordinates, and displays a composite image. However, the image of an area in front of and below the cameras and close to the vehicle cannot be displayed because the area is obstructed by part of the vehicle. The image pickup apparatus draws an illustration border line indicative of the external shape of the vehicle in such a no-image portion in which the image of the surroundings is not provided. In other words, the image pickup apparatus provides a screen display such that part of the vehicle is located in the no-image portion. This prevents the display from becoming unnatural, such as when the no-image portion has no image or is filled with a specific color.

Since the image pickup apparatus provides a screen display such that part of the vehicle is present in the no-image portion, the distance between the illustration border line and the image of an obstacle, which are viewed on the screen, is displayed as less than the distance between the actual vehicle and the obstacle. This allows the distance between the actual vehicle and the obstacle to include a safety factor.

The "illustration border line" in this specification indicates only the boundary between the vehicle and its surroundings when the image is projected from the top. The area enclosed by the illustration border line may have the shape of the vehicle or no image or may be filled with a specific color. The "illustration of the vehicle" in this specification may indicate an illustration in which the windows and the hood are drawn inside the outline similar to the outline of the vehicle as viewed from the top.

In this case, the no-image portion may include an area ahead of the front end of the vehicle and an area behind the rear end of the vehicle.

According to a second embodiment of the invention, there is provided an on-vehicle image pickup apparatus including: a plurality of cameras disposed at a plurality of positions on a vehicle; an image processing section that processes images taken by the plurality of cameras; and a display device that displays the images processed by the image processing section. The cameras each have a lens capable of focusing the light of an image in a wide-angle space area and an optical-detector that detects the light focused by the lens. The image processing section performs the process of combining the images of the surroundings of the vehicle taken by the cameras and the process of combining an illustration border line indicative of the outer shape of the vehicle with a vehicle display portion onto a screen. The illustration border line is displayed outside the outline of the actual image of the vehicle in the image.

In this case, the illustration border line may be formed ahead of the front end of the actual image of the vehicle; the illustration border line may be formed behind the rear end of the actual image of the vehicle; or the illustration border line may be formed both ahead of the front end and behind the rear end of the actual image of the vehicle. Alternatively, the illustration border line may be formed outside the right and left sides of the actual image of the vehicle.

According to the second embodiment of the invention, the illustration of the vehicle may be formed in the area enclosed by the illustration border line.

According to the second embodiment of the invention, the display screen displays the image of the surroundings and the shape of the vehicle indicated by the illustration border line or the illustration. The outline of the illustration of the vehicle is formed outside the end of the actual image of the vehicle. In other words, the illustration of the vehicle is set to be larger than the actual image of the vehicle. This decreases the distance between the image of the vehicle and the image of an obstacle displayed on the display screen, as compared with the relative distance between the actual vehicle and the obstacle, thereby improving driving safety.

In this case, the image processing section may perform the process of displaying the illustration border line varied in position on the display screen. For example, the image processing section may detect the inclination angle of the vehicle with respect to the horizontal surface, and may display the portion of the illustration border line at the side to which the vehicle is tilted in a position outside the end of the actual image of the vehicle. The portion of the illustration border line opposite to the side to which the vehicle is tilted may be displayed in a position adjacent to the end of the actual image of the vehicle.

This changing of the display position of the illustration border line according to the attitude of the vehicle allows the actual rolling of the vehicle to be reflected on the display screen, facilitating recognition of the distance between the rolling vehicle and a side obstacle from the screen.

Alternatively, the on-vehicle image pickup apparatus may further include a speed monitoring section that monitors the speed of the vehicle. The image processing section may perform the process of changing the position of the illustration border line according to the speed of the vehicle.

The on-vehicle image pickup apparatus according to the first embodiment of the invention places an illustration indicative of the shape of the vehicle in a no-image portion close to the vehicle, which cannot be captured by the cameras. This prevents the display screen from becoming unnatural such that the no-image portion has no image or a solid filled portion irrelevant to the vehicle and the ground, thereby allowing a natural image to be displayed.

The on-vehicle image pickup apparatus according to the second embodiment of the invention displays the image of the surroundings projected in plane and the illustration of the vehicle such that the illustration of the vehicle is slightly larger than the actual image of the vehicle. This allows the distance between the vehicle and an obstacle to be displayed as smaller than the actual distance on the screen, thus enhancing driving safety.

DESCRIPTION OF THE PREFERRED EMBODIMENTS

Figure 1:
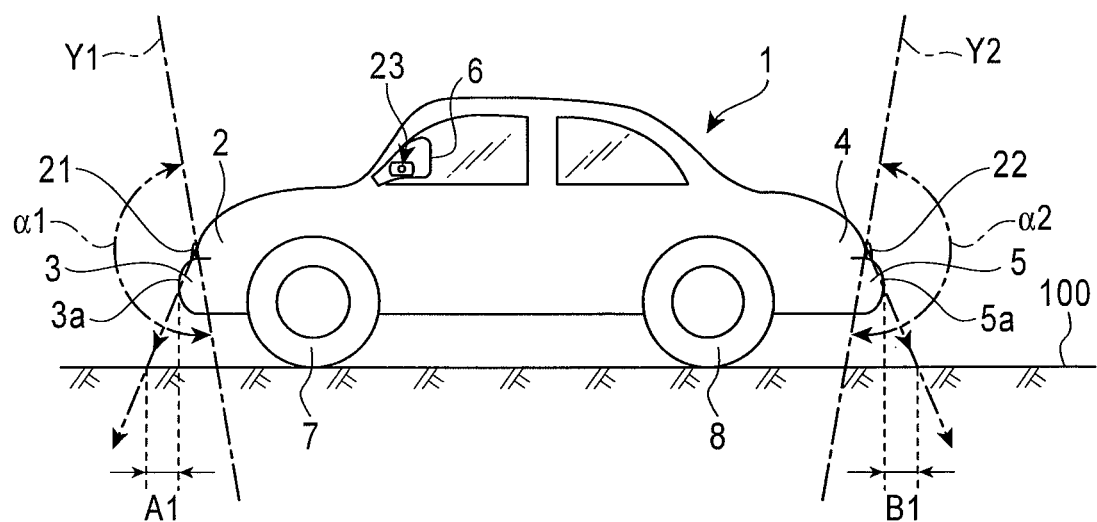
FIG. 1 is a left side view of a vehicle equipped with an on-vehicle image pickup apparatus according to an embodiment of the invention.
Figure 2:
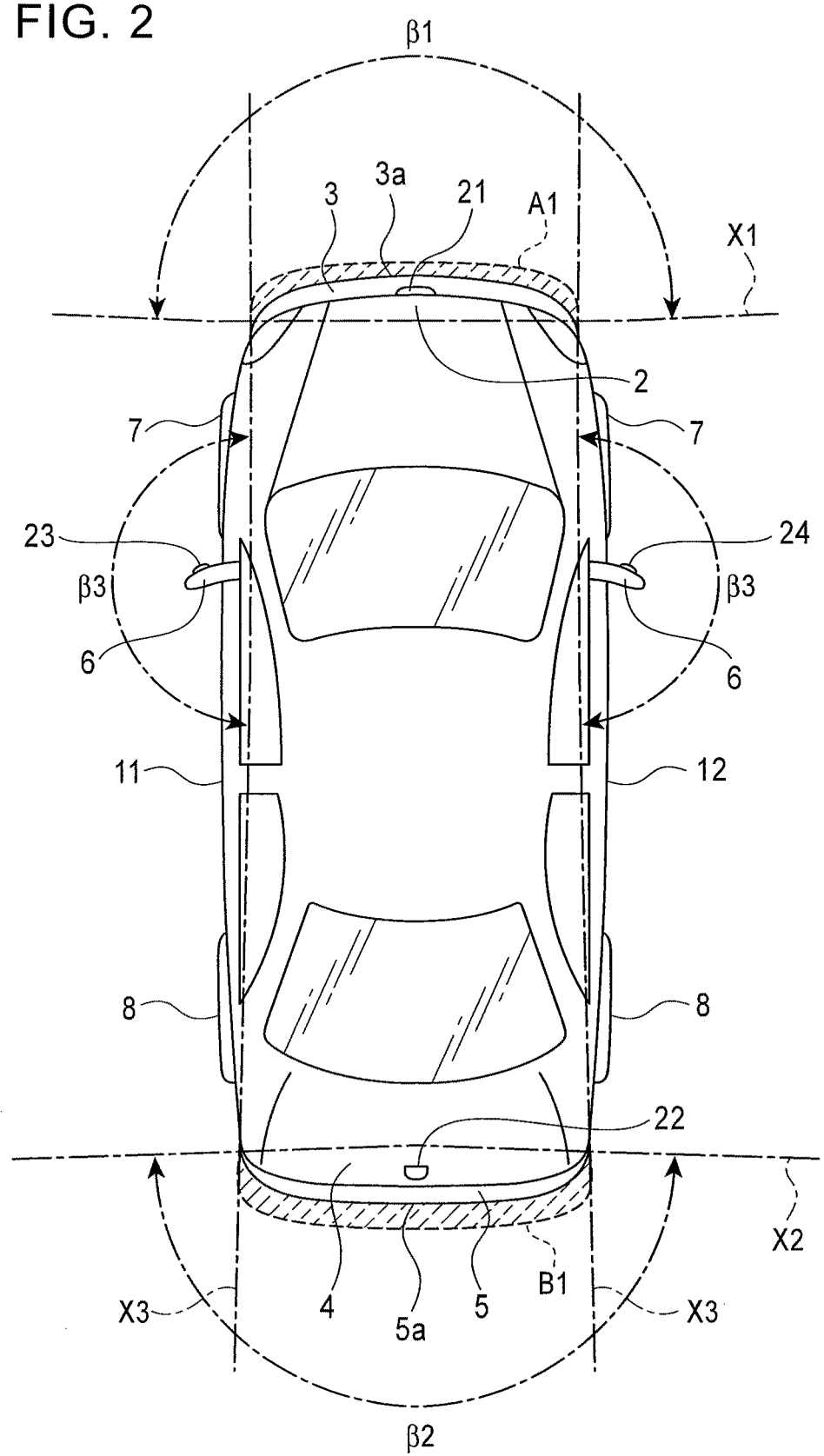
FIG. 2 is a plan view of the vehicle equipped with the on-vehicle image pickup apparatus according to the embodiment of the invention.
Figure 3:
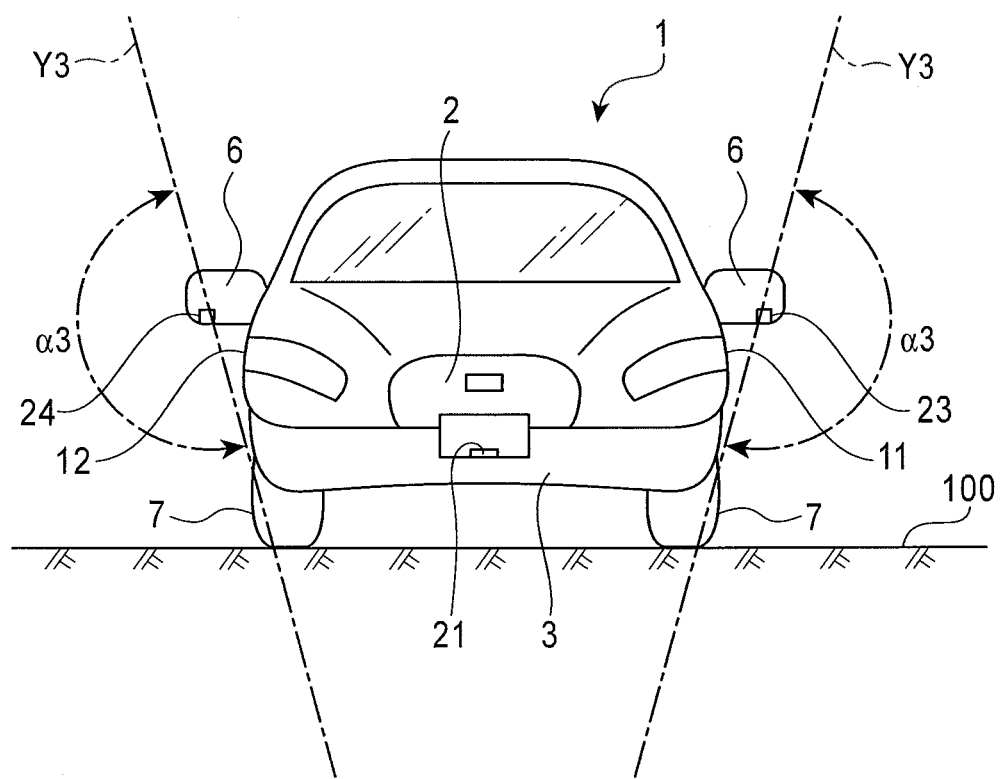
FIG. 3 is a front view of the vehicle equipped with the on-vehicle image pickup apparatus according to the embodiment of the invention.

FIGS. 1 to 3 show a vehicle 1. The diagram of the vehicle 1 shows not an image displayed on the screen of a display device but an actual vehicle.

The vehicle 1 has a front bumper 3 at a front end 2, and a rear bumper 5 at a rear end 4. Front wheels 7 and 7 and rear wheels 8 and 8 are provided on either side of the vehicle 1. Door mirrors 6 and 6 are provided between the front wheels 7 and 7 and the rear wheels 8 and 8 closer to the front wheels 7 and 7 and toward the upper part of the side of the vehicle 1.

A front camera 21 is disposed at the front end 2 of the vehicle 1. The front camera 21 is located at the center of the width of the vehicle 1 at the front end 2 of the vehicle 1. As shown in FIGS. 1 and 2, the front camera 21 is located slightly behind a front end 3a of the front bumper 3 which is the forefront end of the vehicle 1. A rear camera 22 is disposed at the rear end 4 of the vehicle 1. The rear camera 22 is located at the center of the width of the vehicle 1 at the rear end 4 of the vehicle 1. As shown in FIGS. 1 and 2, the rear camera 22 is located slightly ahead of a rear end 5a of the rear bumper 5 which is the rearmost end of the vehicle 1.

The left door mirror 6 is fitted with a left camera 23. The right door mirror 6 is fitted with a right camera 24. As shown in FIG. 2, the left camera 23 is disposed at a position spaced away from the left side 11 of the vehicle 1 to the left, and the right camera 24 is disposed at a position spaced away from the right side 12 of the vehicle 1 to the right.

The cameras 21, 22, 23, and 24 each include a fisheye lens and a photo-detector (image pickup element) having a plurality of detecting points that detect light focused by the fisheye lens. The photo-detector may be a CCD or a CMOS.

The fisheye lens is a combination of a plurality of lenses. The angle of view that the photo-detectors of the cameras 21, 22, 23, and 24 using the fisheye lens can cover is wide, which can be set from about 150 to 180 degrees or from about 150 to 190 degrees.

The front camera 21 is set such that its optical axis is directed to the front and slightly downward from the horizontal line toward the ground 100. Likewise, the rear camera 22 is set such that the optical axis is directed to the back and slightly downward from the horizontal line toward the ground 100.

FIG. 1 shows the vertical angle of view of the front camera 21 by $\alpha1$, and the limit of the angle of view $\alpha1$ by Y1. FIG. 2 shows the limit X1 of the lateral angle of view of the ground 100 taken by the front camera 21. The limit X1 corresponds to the intersection between the limit Y1 of the vertical angle of view and the ground 100. The lateral angle of view of the limit Y1 is $\beta1$.

Likewise, FIG. 1 shows the vertical angle of view of the rear camera 22 by $\alpha2$, and the limit of the angle of view $\alpha2$ by Y2. FIG. 2 shows the limit X2 of the lateral angle of view of the ground 100 taken by the rear camera 22. The limit X2 corresponds to the intersection between the limit Y2 of the vertical angle of view and the ground 100. The lateral angle of view of the limit Y2 is $\beta2$.

As shown in FIG. 3, the optical axes of the left camera 23 and the right camera 24 are directed downwardly to the right and the left, respectively, relative to a horizontal line, or the ground 100.

FIG. 3 shows the vertical angles of view of the left camera 23 and the right camera 24 by $\alpha3$, and shows the limit of the angle of view $\alpha3$ by Y3. FIG. 2 shows the limit X3 of the lateral angle of view of the ground 100 taken by the left camera 23 and the right camera 24. The limit X3 corresponds to the intersection between the limit Y3 of the vertical angle of view and the ground 100. The lateral angle of view of the limit Y3 is $\beta3$. The maximum values of the angles $\alpha1$, $\beta1$, $\alpha2$, $\beta2$, $\alpha3$, and $\beta3$ are around 180 degrees, as described above, depending on the specification of the fisheye lenses, which may be set to 190 or more degrees.

Figure 5:
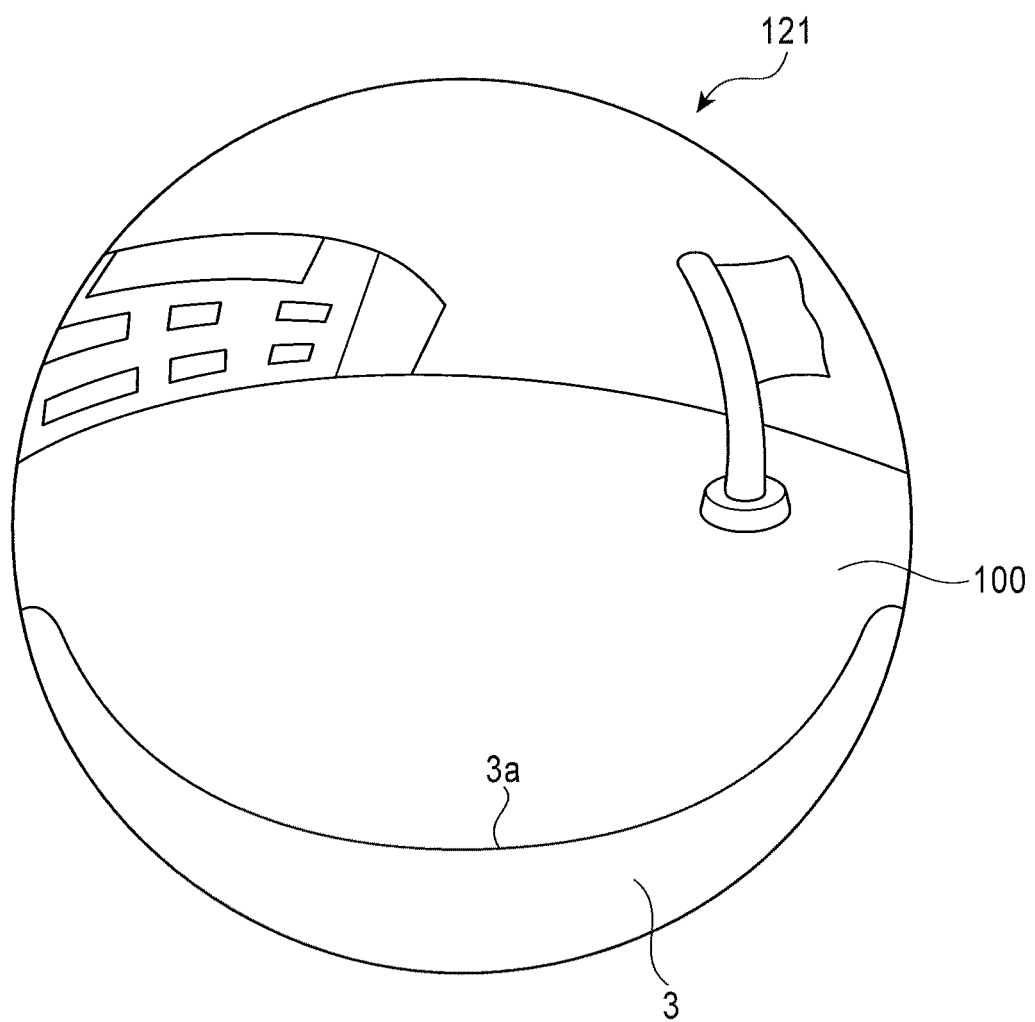
FIG. 5 is a diagram of an actual image taken by a front camera.

FIG. 5 shows a real image 121 focused by the fisheye lens of the front camera 21 and taken by a photo-detector, such as a CCD, in which a plurality of light-receiving elements is arranged in plane. The real image 121 shows a view in front of the vehicle 1 within the range of the angles of view, $\alpha1$ and $\beta1$. However, since the lens of the front camera 21 is located behind the front end 3a of the front bumper 3, as shown in FIG. 1, the image of the nearby surroundings, such as the ground 100 and other obstacles close to the front end 3a, are hidden from the camera behind the front bumper 3, so that the image cannot be captured.

FIG. 1 shows an area A1 in front of the front end 3a whose image cannot be taken by the front camera 21. FIG. 2 shows the area A1 whose image cannot be taken by the front camera 21 when viewed downward from above the vehicle 1 along a line of sight vertical to the ground 100. The area A1 is a front no-image portion.

The real image 121 shown in FIG. 5 shows the front bumper 3, as part of the vehicle 1, which hides the no-image portion A1 obliquely to the front.

Figure 6:
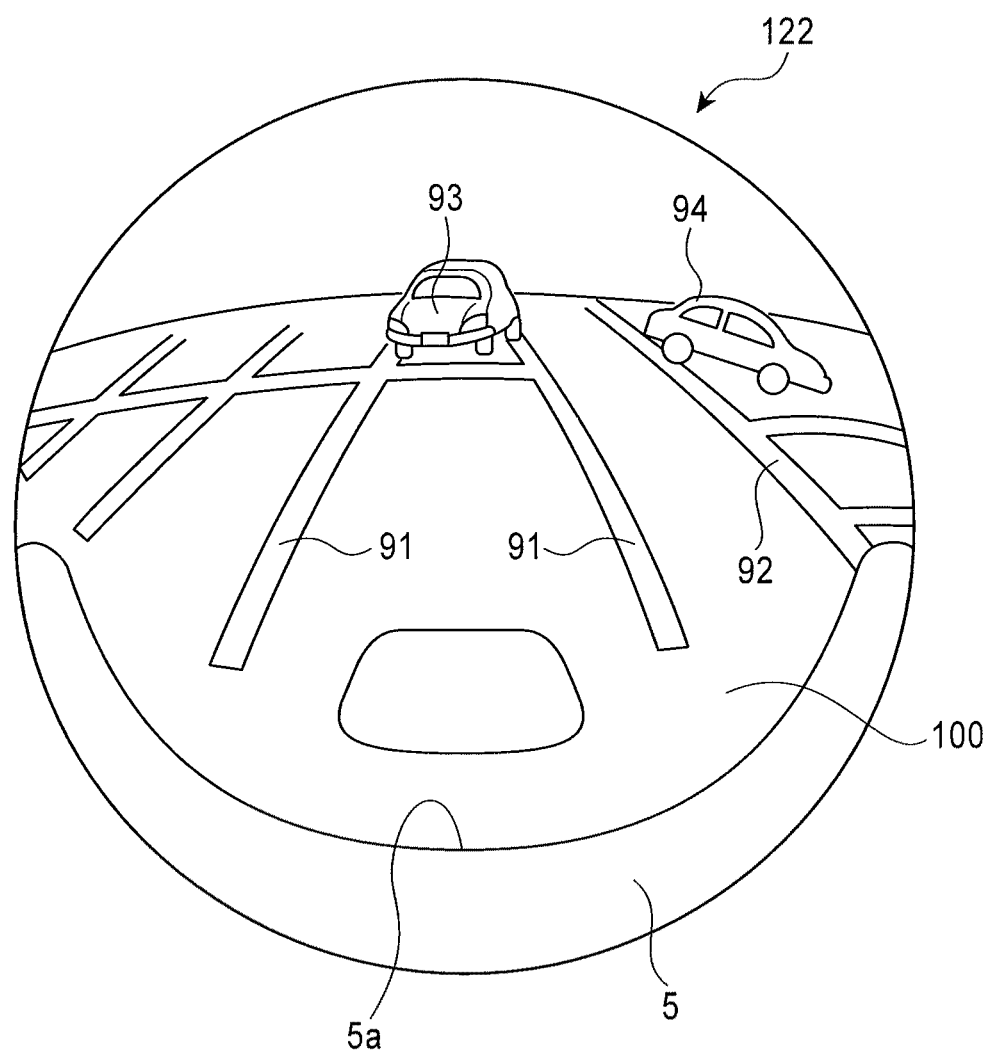
FIG. 6 is a diagram of an actual image taken by a rear camera.

FIG. 6 shows a real image 122 focused by the fisheye lens of the rear camera 22 and taken by a photo-detector, such as a CCD. The real image 122 shows a view behind the vehicle 1 within the range of the angles of view, $\alpha2$ and $\beta2$. Since the lens of the rear camera 22 is located slightly ahead of the rear end 5a of the rear bumper 5, as shown in FIG. 1, the image of an area close to the rear end 5a of the rear bumper 5 including the ground 100 and other obstacles cannot be captured. FIG. 1 shows this area by reference B1, and FIG. 2 also shows this area by reference B1 with broken lines. The area B1 is a rear no-image portion. As shown in FIG. 2, this no-image portion B1 can be seen when viewed from above along a line of view vertical to the ground 100.

The real image 122 shown in FIG. 6 shows part of the rear bumper 5 that hides the no-image portion B1 from the view of the rear camera 22.

The real image 122 of FIG. 6 shows, behind the vehicle 1, distorted white lines 91 and 91 printed on the ground 100 and a nearby distorted white line 92 printed on the ground 100 to the left side 11 of the vehicle 1. The image of another car 93 located just behind the vehicle 1 and the image of another car 94 located at the left rear of the vehicle 1 are also distorted.

Figure 7:
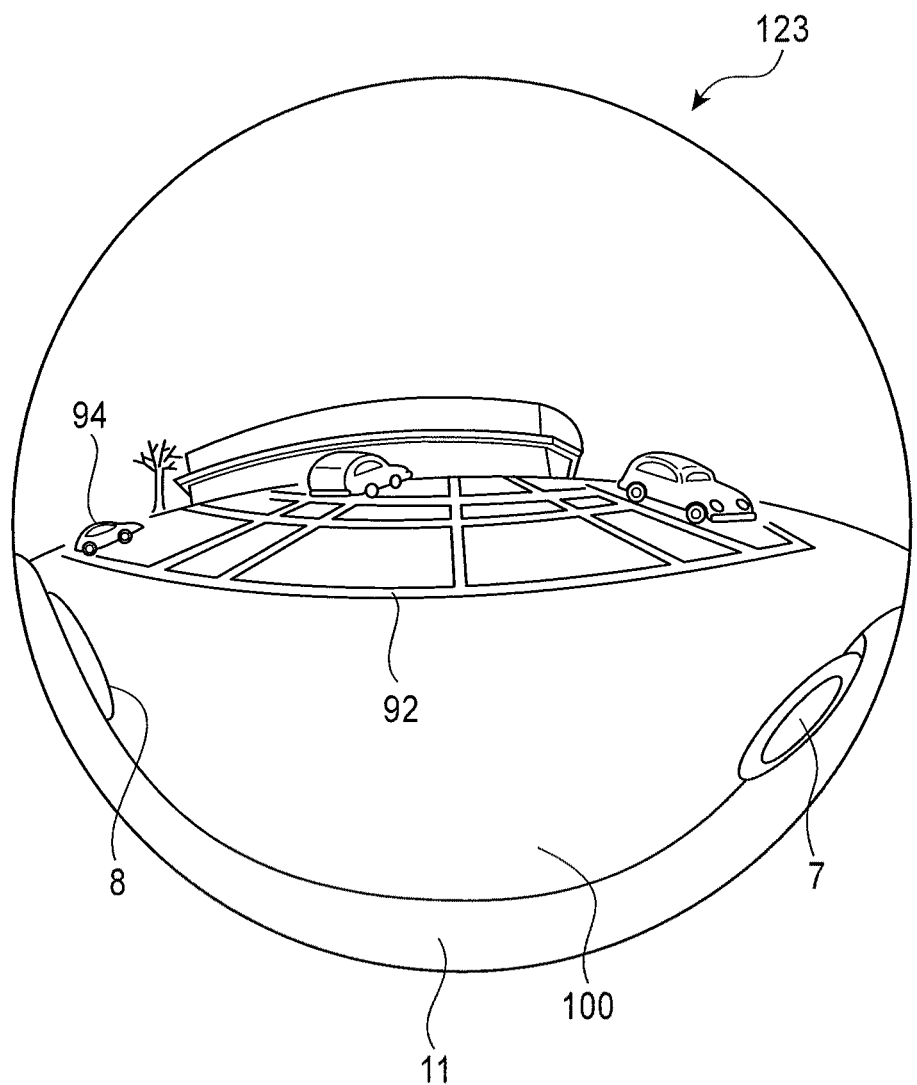
FIG. 7 is a diagram of an actual image received by the photo-detector of a left camera.

FIG. 7 shows a real image 123 focused by the fisheye lens of the left camera 23 and taken by a photo-detector, such as a CCD. The angle of view of the real image 123 is within the range of the angles of view, $\alpha3$ and $\beta3$. As shown in FIG. 3, the left camera 23 is disposed on the door mirror 6 and spaced apart from the left side 11 of the vehicle 1, in which the optical axis of its lens is directed slightly downward from the horizontal line toward the ground 100. Therefore, the real image 123 shows the image of the lower part of the left side 11 of the vehicle 1 across the entire area along the length of the vehicle 1 and includes the front wheel 7 and the rear wheel 8. As is apparent from the limit Y3 of the angle of view shown in FIG. 3, the real image 123 in FIG. 7 clearly shows the boundary between the vehicle 1 and the ground 100, that is, the contact portion between the front wheel 7 and the ground 100 and the contact portion between the rear wheel 8 and the ground 100.

The real image 123 in FIG. 7 does not include a no-image portion in which the image of the ground 100 close to the vehicle 1 is partly absent, like the front no-image portion A1 and the rear no-image portion B1 shown in FIGS. 1 and 2.

The real image 123 in FIG. 7 also shows the image of the nearby white line 92 printed on the ground 100 to the left of the vehicle 1 and the image of the car 94 located at the left rear of the vehicle 1, shown in FIG. 6.

Although not shown, an image taken by the right camera 24 is similar to the image in FIG. 7 and shows the lower part of the right side 12 of the vehicle 1 including the front wheel 7 and the rear wheel 8. In other words, the image shows the boundary between the right side 12 of the vehicle 1 and the ground 100, that is, the contact portion between the front wheel 7 and the ground 100 and the contact portion between the rear wheel 8 and the ground 100.

Figure 4:
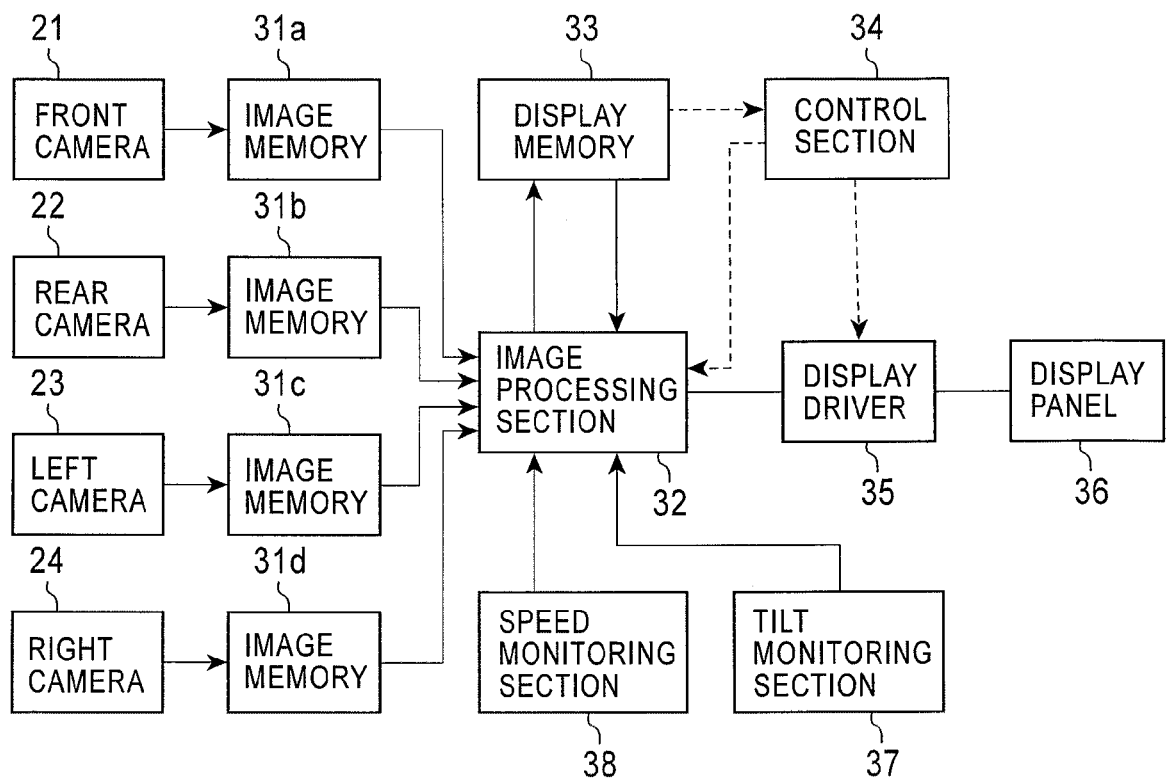
FIG. 4 is a block diagram of the on-vehicle image pickup apparatus.

FIG. 4 is a block diagram showing a circuit configuration for processing the images taken by the cameras and displaying the processed image.

An image detected by the optical-detector, such as a CCD, of the front camera 21 is sent to an image memory 31a for storage. Similarly, images detected by the respective optical-detectors of the rear camera 22, the left camera 23, and the right camera 24 are sent to an image memory 31b, an image memory 31c, and an image memory 31d, respectively, for storage.

The image signals detected by the optical-detectors of the cameras 21, 22, 23, and 24 are sent, as pixel data of each pixel, from their respective image memories 31a, 31b, 31c, and 31d to an image processing section 32. The image processing section 32 has a display memory 33, in which the pixel data of the image changing in real time are stored, and thereafter processed by the image processing section 32. The image processing section 32 and the display memory 33 are controlled by a control section 34. The control section 34 is mainly composed of a CPU, and controls the image processing section 32 and a display driver 35. The image data processed by the image processing section 32 is sent to the display driver 35, so that the image is displayed on a display panel 36, such as a liquid-crystal display panel, in the vehicle 1.

The general projection model of the fisheye lenses used in the cameras 21, 22, 23, and 24 is an equidistance projection, in which the expression ra=f·$\theta_i$ holds, where ra is the image height and f is the focal length. Other projection models of the fisheye lenses include equisolid angle projection, in which the expression ra=2f·sin($\theta_i$/2) holds, and orthographic projection, in which the expression ra=f·sin $\theta_i$ holds.

Assume that a flat optical-detector, such as a CCD, of a camera is an image pickup surface and an axis extending vertically from the center of the image pickup surface is an optical axis. If the projection model of the fisheye lens is determined, the position of the spatial point which is the base of an image point imaged on the image pickup surface can be determined. Specifically, the zenith angle of the line on which the spatial point is present with respect to the optical axis and the azimuth angle about the optical axis can be determined.

Accordingly, if the positions of the cameras and the directions of their optical axes are determined, information on the portion of the images shown in FIGS. 5 to 7 and enlargement ratios and directions necessary for projecting the images onto a flat image parallel to the ground 100 can be determined. Specifically, the pixel data stored in the image memories 31a, 31b, 31c, and 31d are temporarily stored in the display memory 33, and are then sent to the image processing section 32. The image processing section 32 enlarges or reduces the pixel data according to the coordinates of the pixel data, and maps the pixel data to their respective positions on the flat image parallel to the ground 100 into a composite image projected in plane.

As shown in FIG. 2, there is an overlapping portion between the image taken by the front camera 21 and the image taken by the left camera 23 at the front left of the vehicle 1, and an overlapping portion between the image taken by the front camera 21 and the image taken by the right camera 24 at the front right of the vehicle 1. Likewise, there is an overlapping portion between the image taken by the rear camera 22 and the image taken by the left camera 23 at the rear left of the vehicle 1. In the real image 122 taken by the rear camera 22, shown in FIG. 6, and the real image 123 taken by the left camera 23, shown in FIG. 7, the image of the car 94 and the image of the white line 92 are in the overlapping portion. There is also an overlapping portion between the image taken by the rear camera 22 and the image taken by the right camera 24 at the rear right of the vehicle 1.

The image processing section 32 uses an image taken by a predetermined one of two cameras for the overlapping portion where images by two cameras overlap. In this case, it is preferable to use, of the images detected by the optical-detectors as shown in FIGS. 5 to 7, a real image with a low reduction ratio to improve the quality of the display image.

As described above, the image processing section 32 combines the pixel data obtained from the image memories 31a, 31b, 31c, and 31d to form a composite image to be projected onto plane coordinates parallel to the ground 100 around the vehicle 1. Flat images combined by the image processing section 32 are sent to the display driver 35 in sequence with time under the control of the control section 34 to form moving-image display data. The composite images are displayed on the display screen of the display panel 36 according to this display data. The display screen displays the composite images as a time-varying moving image.

Figure 8:
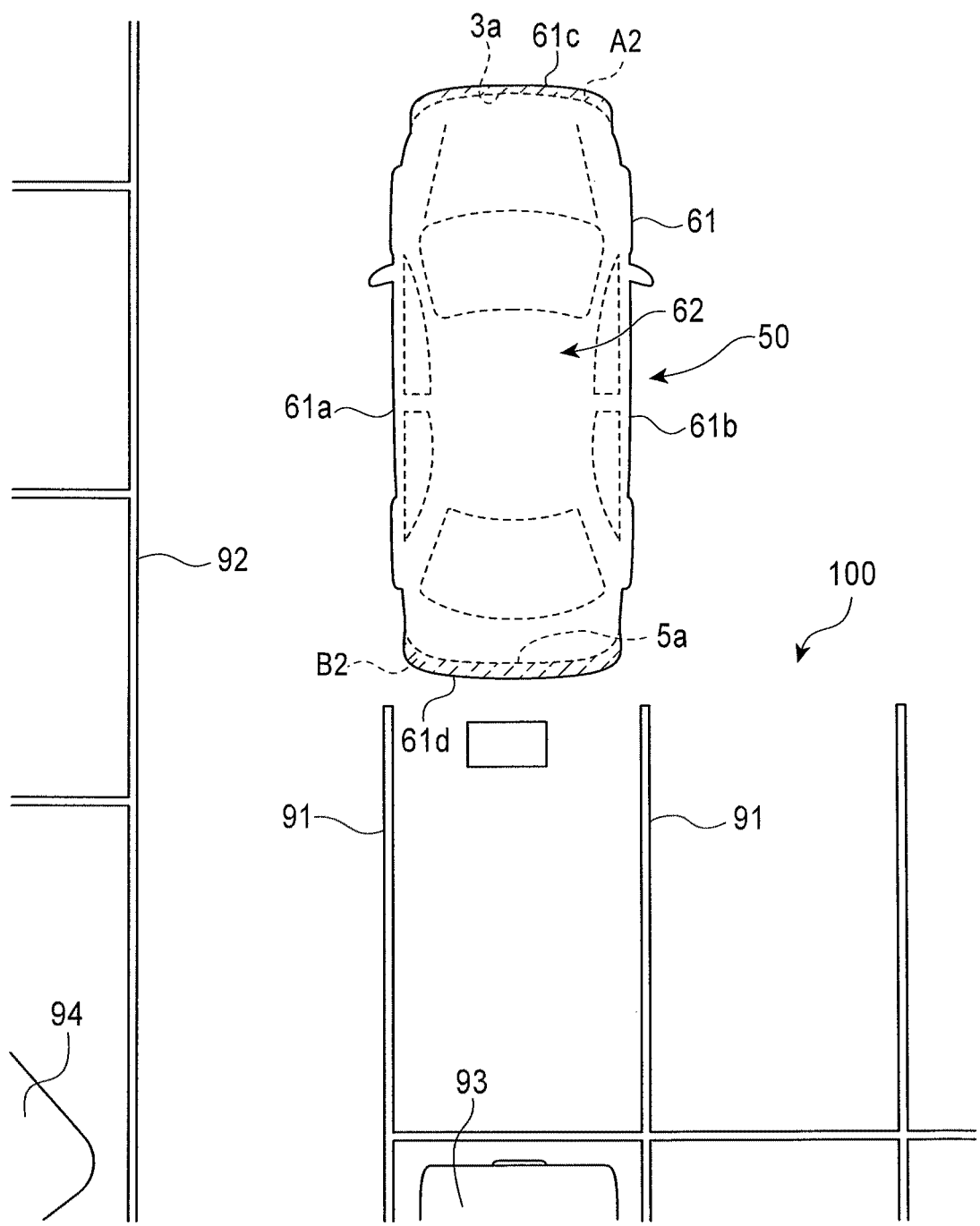
FIG. 8 is a diagram illustrating a display example on a screen.

FIG. 8 is a fragmentary enlarged view of an example of the image displayed on the display screen of the display panel 36, such as a liquid-crystal display panel. Of the real images 121 to 123 taken by the cameras 21 to 23, shown in FIGS. 5 to 7, the image of the ground 100, which is the image of the surroundings of the vehicle 1, is processed by the image processing section 32, and converted into an image projected on plane coordinates. The display screen mainly displays the ground 100 around a vehicle display portion 50 as a flat image.

As shown in FIG. 8, an image projected onto plane coordinates parallel to the ground 100 is generated. Thus, the display screen displays the white lines 91 and 91 printed on the ground 100 substantially in parallel, and the flat image of the car 93 behind the vehicle 1. The display screen also displays the white line 92 in the real image 123 taken by the left camera 23, shown in FIG. 7, at the left of the vehicle display portion 50 in such a manner as to extend linearly along the length of the vehicle 1. The display screen also displays the image of the car 94 in a plane view diagonally behind the vehicle display portion 50 using the real image 122 in FIG. 6 and the real image 123 in FIG. 7.

The cars 93 and 94 are displayed slightly at an angle in the projected flat image of FIG. 8 using a composite image of the real image 122 in FIG. 6 and the real image 123 in FIG. 7 or one of them.

As shown in FIG. 8, the vehicle display portion 50 shows an illustration border line 61. For the illustration border line 61, drawing data created in advance is stored in the display memory 33 shown in FIG. 4. While the display screen is displaying the scenery of the surroundings of the vehicle 1, such as the ground 100, in real time, as shown in FIG. 8, the image processing section 32 estimates a portion where the vehicle 1 is to be present in the image as the vehicle display portion 50. The image processing section 32 draws the illustration border line 61 indicative of the outer shape of the vehicle 1 at the estimated position on the screen according to the drawing data read from the display memory 33 as required.

As shown in FIG. 7, the real image 123 taken by the left camera 23 provides the image of the boundary between the left side 11 of the vehicle 1 and the ground 100 directly. Accordingly, the image processing section 32 can determine the position of the boundary between the left side 11 of the vehicle 1 and the ground 100 in the display screen of FIG. 8 when projecting the real image 123 in FIG. 7 onto plane coordinates. Thus, when the position where the left side 61a of the illustration border line 61 to be drawn is determined from this information, the left side 61a can be displayed substantially at the same position as the boundary between the left side 11 of the vehicle 1 and the ground 100. Likewise, the position where the right side 61b of the illustration border line 61 is to be drawn can be determined from the information obtained by the right camera 24.

However, the front end 61c of the illustration border line 61 is drawn ahead of the position corresponding to the front end 3a of the front bumper 3 of the vehicle 1. In other words, the front end 61c of the illustration border line 61 is displayed further ahead of the area A2 forward of the front end 3a of the front bumper 3.

In the image shown in FIG. 8, the area A2 forward of the front end 3a of the front bumper 3 of the vehicle 1 corresponds to the front no-image portion A1 shown in FIGS. 1 and 2. If the front end 61c of the illustration border line 61 were drawn at a position that agrees with the front end 3a of the front bumper 3, the area A2 ahead of the front end 61c of the illustration border line 61 would become an area with no image of the ground 100. Accordingly, in the display example of FIG. 8, the area A2 in the image corresponding to the no-image portion A1 is included in the range enclosed by the illustration border line 61 indicative of the outer shape of the vehicle 1 to substantially prevent the no-image portion A1 from being displayed on the screen.

Likewise, the rear end 61d of the illustration border line 61 is drawn behind the image position corresponding to the rear end 5a of the rear bumper 5 of the vehicle 1, and the image area B2 corresponding to the no-image portion B1 is set inside the outline of the image of the vehicle 1 defined by the illustration border line 61. Therefore, the no-image portion B1 is substantially not displayed on the screen.

In other words, the illustration border line 61 displayed in the vehicle display portion 50 shown in FIG. 8 is drawn such that the left side 61a and the right side 61b substantially correspond to the left side 11 and the right side 12 of the real image of the vehicle 1, while the front end 61c of the illustration border line 61 is drawn at a position extended forward from the image position corresponding to the front end 3a of the front bumper 3 by the image area A2 corresponding to the no-image portion A1. Likewise, the rear end 61d of the illustration border line 61 is drawn at a position extended backward from the image position corresponding to the rear end 5a of the rear bumper 5 by the image area B2 corresponding to the no-image portion B1.

The area enclosed by the illustration border line 61 may have no image other than the image of the illustration border line 61. Alternatively, the area enclosed by the illustration border line 61 may be filled with one color, such as white, or another color. Alternatively, as shown in FIG. 8, the windows and the hood may be drawn in the area enclosed by the illustration border line 61 so that the area enclosed by the illustration border line 61 is drawn as an illustration 62 equivalent to the top view of the vehicle 1.

Although the areas A2 and B2 in FIG. 8 are hatched with broken lines, this is only for illustrative purpose. The actual image has no hatched portion in the area enclosed by the illustration border line 61.

The vehicle display portion 50 in the display image of FIG. 8 does not include a no-image portion A1 ahead of the front end 61c of the illustration border line 61 corresponding to the image of the vehicle 1 and does not include a no-image portion B1 behind the rear end 61d. This eliminates the need for providing an area having no image or a display area painted with a single color different from the vehicle 1 ahead of the front end 61c of the illustration border line 61 and behind the rear end 61d. This eliminates an insecure feeling of the driver due to an interruption in the display ahead of the front end 61c and behind the rear end 61d.

Moreover, this allows the driver to check the distance between the rear end 61d of the illustration border line 61 and the image of the car 93 behind the vehicle 1 on the screen when moving the vehicle 1 backward from the state of FIG. 8, thereby significantly reducing the possibility of a collision of the vehicle 1 with the obstacle.

Particularly, the illustration border line 61 shown in FIG. 8 extends forward from the image of the actual vehicle 1 by an amount corresponding to the area A2, and extends backward from the image of the actual vehicle 1 by an amount corresponding to the area B2. This adds a safety interval to the distance between the actual vehicle 1 and the obstacle, thereby improving safety.

Figure 9:
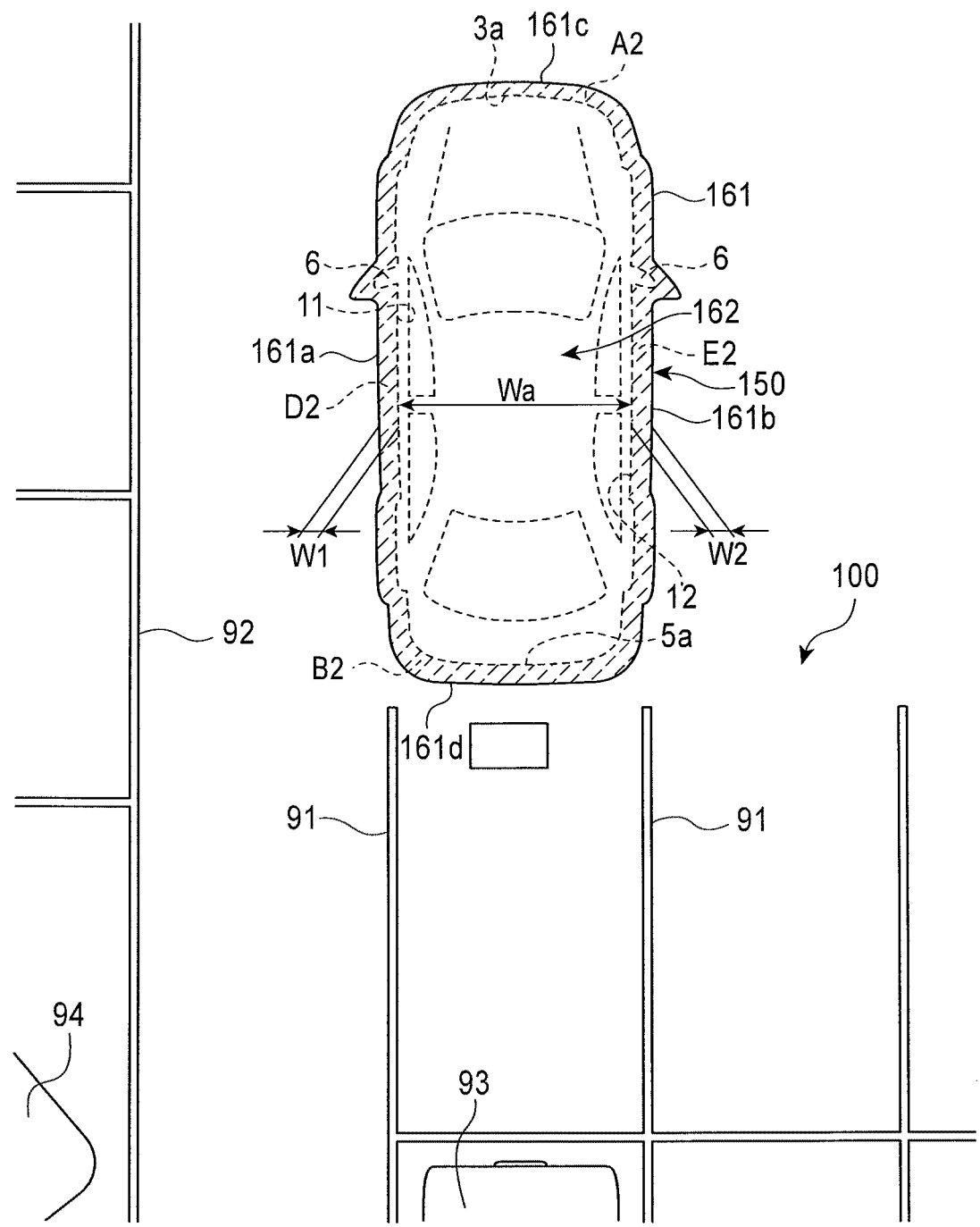
FIG. 9 is a diagram illustrating another display example on the screen.

FIG. 9 is a diagram illustrating a second display example on the display screen of the display panel 36.

In the display example of FIG. 9, the image of the ground 100, which is the landscape of the surroundings of the vehicle 1, is projected on plane coordinates. The image of the surroundings of the vehicle 1 is the same as FIG. 8. However, the display of a vehicle display portion 150 in FIG. 9 is different from the vehicle display portion 50 in FIG. 8.

In the display example of FIG. 9, an illustration border line 161 indicative of the outer shape of the vehicle 1 is drawn in the vehicle display portion 150. FIG. 9 shows the illustration border line 161 with a solid line, and the outline of the actual image of the vehicle 1 with a broken line. The illustration border line 161 is drawn in the vehicle display portion 150 in such a manner as to be sized slightly larger than the actual outline of the vehicle 1. Although FIG. 9 shows the broken line indicative of the actual outline of the vehicle 1 for illustrative purpose, the broken line is not displayed in the actual image, and the illustration border line 161 drawn with a solid line is displayed in the vehicle display portion 150. The area enclosed by the illustration border line 161 may either have no image or be filled with any one color. Alternatively, the area enclosed by the illustration border line 161 may be drawn as an illustration 162 of the vehicle 1, in which the windows and the hood are drawn.

Like the vehicle display portion 50 shown in FIG. 8, the front end 161c of the illustration border line 161 is drawn ahead of the front end 3a of the actual image of the vehicle 1, and the area A2 is included inside the image of the vehicle 1 defined by the illustration border line 161. Likewise, the rear end 161d of the illustration border line 161 is drawn behind the rear end 5a of the actual image of the vehicle 1, and the area B2 is included inside the image of the vehicle 1 defined by the illustration border line 161.

The left side 161a of the illustration border line 161 is drawn to the left of the image position corresponding to the left side 11 of the actual image of the vehicle 1. The right side 161b of the illustration border line 161 is drawn to the right of the image position corresponding to the right side 12 of the actual image of the vehicle 1.

In other words, there is a margin area D2 between the left side 161a of the illustration border line 161 and the left side 11 of the actual image of the vehicle 1, and there is a margin area E2 between the right side 161b of the illustration border line 161 and the right side 12 of the actual image of the vehicle 1. In FIG. 9, the width of the actual image of the vehicle 1 is indicated by Wa, the width of the margin area D2 is indicated by W1, and the width of the margin area E2 is indicated by W2. With the vehicle 1 in a normal driving state, the width W1 of the margin area D2 and the width W2 of the margin area E2 are equal to each other.

The illustration border line 161 is displayed in the vehicle display portion 150 of FIG. 9 in such a manner as to be sized slightly larger than the actual broken-line outline of the vehicle 1 in all directions, to the front and back and to the right and left. There is therefore no area A2 without the image of the ground 100 ahead of the front end 161c of the illustration border line 161 and no area B2 without the image of the ground 100 behind the rear end 161d. This eliminates an insecure feeling of the driver due to an interruption in the display ahead of and behind the outline of the vehicle 1 indicated by the illustration border line 161.

Furthermore, the vehicle display portion 150 includes the margin areas D2 and E2 on the right and left, respectively.

This allows the distance between the actual outer surface of the vehicle 1 and an obstacle to be greater than the distance between the illustration border line 161 and the image of the obstacle, which can be checked with the image, when the driver is driving on a narrow road or parking. This allows the driver to reduce the possibility of a collision of the actual vehicle 1 with an obstacle by determining the position of the obstacle with reference to the image.

The image processing section 32 can change the position of the illustration border line 161, for example, the positions of the left side 161a and the right side 161b, according to the circumstances. For example, the image processing section 32 can change the relative position between the illustration border line 161 and the actual image of the vehicle 1 to the right and left without changing the width between the left side 161a and the right side 161b or the width of the illustration 162 of the vehicle 1 in which the windows and the hood are drawn.

Figure 10:
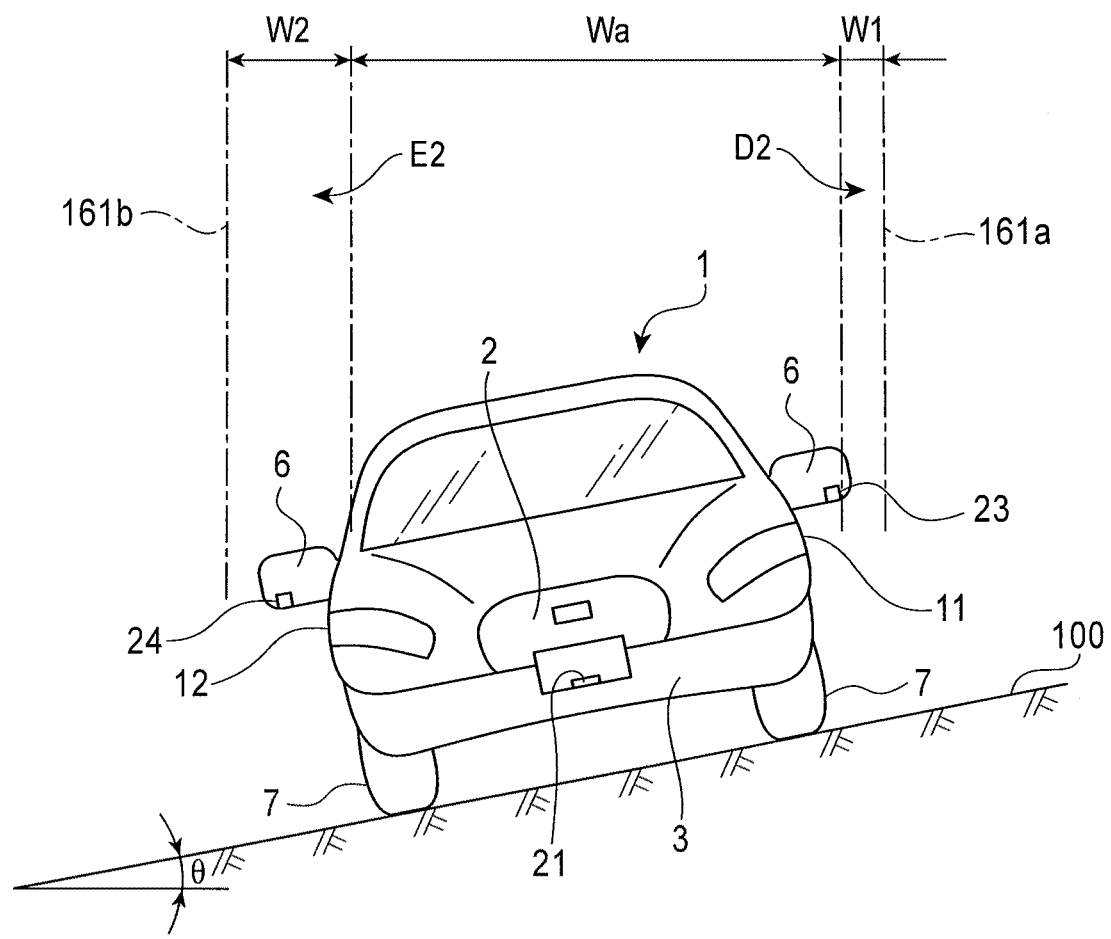
FIG. 10 is a diagram illustrating the relationship between the tilt of the vehicle and the illustration border line.

FIG. 10 shows a state of the vehicle 1 in which the ground 100 is inclined at an angle θ so that the vehicle 1 is significantly tilted to the right during driving. The tilt of the vehicle 1 can be detected by a tilt monitoring section 37 (see FIG. 4) such as an attitude sensor mounted on the vehicle 1 or a sensor for sensing the expansion and contraction of the suspension that supports the front wheel 7 or the rear wheel 8. Alternatively, information on the inclination of the ground 100 may be provided from external information through a car navigation system.

As shown in FIG. 10, when the ground 100 is inclined, the attitude of the vehicle 1 as viewed vertically from the top is noticeably displaced to the right which is the direction of the inclination of the ground 100. The image processing section 32 changes the widths of the margin areas D2 and E2 according to the tilt of the vehicle 1 according to the information of the tilt of the vehicle 1 obtained by the control section 34. In the case of FIG. 10, the image processing section 32 increases the width W2 of the right margin area E2 and decreases the width W1 of the left margin area D2. As a result, the image of the outline of the vehicle 1, indicated by the illustration border line 161, is shifted to the right which is the direction of the tilt of the vehicle 1.

This process allows the margin areas D2 and E2 of the tilted vehicle 1 to be set appropriately, thereby preventing, for example, the problem of a collision of part of the vehicle 1, such as the door mirror 6, with a side obstacle due to the tilt of the vehicle 1 by the driver viewing the image.

When the ground 100 is inclined so that the front of the vehicle 1 is directed downward, the front end 161c of the illustration border line 161 may be displayed further ahead, and when the ground 100 is inclined so that the rear of the vehicle 1 is directed downward, the rear end 161d of the illustration border line 161 may be displayed further behind.

The control section 34 may have a speed monitoring section 38, as shown in FIG. 4. Thus the control section 34 can control the vehicle 1 such that when the vehicle 1 is driving at high speed, the width W1 of the margin area D2 and the width W2 of the margin area E2 are decreased or brought to zero; when the vehicle 1 is driving at a speed less than a predetermined speed, the widths W1 and W2 are increased so that the margin areas D2 and E2 are provided sufficient for driving along a narrow road or parking.

With this invention, in the display examples of FIGS. 8 and 9, only the front end 61c of the illustration border line 61 and the front end 161c of the illustration border line 161 may be displayed ahead of the area A2, and the no-image area B2 may be provided at the rear; in contrast, the rear end 61d of the illustration border line 61 and the rear end 161d of the illustration border line 161 may be displayed behind the area B2, and the no-image area A2 may be provided in front.

Alternatively, in the display example of FIG. 9, only the margin areas D2 and E2 may be provided and the front and rear areas A2 and B2 may not be included inside the outline of the vehicle 1 indicated by the illustration border lines 61 and 161. In other words, the margin areas between the illustration border line 61 or 161 and the actual image of the vehicle 1 may be provided either around the entire periphery of the vehicle 1 or only part of the periphery of the vehicle 1.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. An on-vehicle image pickup apparatus comprising:
a plurality of cameras disposed at a plurality of positions on a vehicle;
an image processing section that processes images taken by the plurality of cameras; and
a display device that displays the images processed by the image processing section, wherein
the cameras each have a lens capable of focusing the light of an image in a wide-angle space area and an optical-detector that detects the light focused by the lens;
the image processing section performs a process of combining the images of the surroundings of the vehicle taken by the cameras; a process of displaying an illustration border line in a vehicle display portion on a screen, wherein the illustration border line extends outwardly beyond at least one portion of an image of the vehicle and the shape of the illustration border line is based on the outer shape of the at least one portion of the image of the vehicle; and a process of displaying the illustration border line in such a manner that a no-image portion in which an image of an area close to the vehicle could not be captured is included in the area enclosed by the illustration border line; and
the image processing section detects an inclination angle of the vehicle with respect to horizontal and displays a portion of the illustration border line at a side to which the vehicle is tilted at a position outside the outline of the actual vehicle by a first margin area having a first width, and displays a portion of the illustration border line at a side opposite the side to which the vehicle is tilted at a position outside the outline of the actual vehicle by a second margin area having a second width less than the first width.

2. The on-vehicle image pickup apparatus according to claim 1, wherein an illustration of the vehicle is formed in the area enclosed by the illustration border line.

3. The on-vehicle image pickup apparatus according to claim 1, wherein the no-image portion includes an area ahead of the front end of the vehicle and an area behind the rear end of the vehicle.

4. An on-vehicle image pickup apparatus comprising:
a plurality of cameras disposed at a plurality of positions on a vehicle;
an image processing section that processes images taken by the plurality of cameras; and
a display device that displays the images processed by the image processing section, wherein the cameras each have a lens capable of focusing the light of an image in a wide-angle space area and an optical-detector that detects the light focused by the lens;

the image processing section performs a process of combining the images of the surroundings of the vehicle taken by the cameras and a process of combining an illustration border line with a vehicle display portion onto a screen, wherein the illustration border line extends outwardly beyond at least one portion of an image of the vehicle and the shape of the illustration border line is based on the outer shape of the at least one portion of the image of the vehicle;

the illustration border line is displayed outside the outline of the actual vehicle; and the image processing section detects an inclination angle of the vehicle with respect to horizontal and displays a portion of the illustration border line at a side to which the vehicle is tilted at a position outside the outline of the actual vehicle by a first margin area having a first width, and displays a portion of the illustration border line at a side opposite the side to which the vehicle is tilted at a position outside the outline of the actual vehicle by a second margin area having a second width less than the first width.

5. The on-vehicle image pickup apparatus according to claim 4, wherein the illustration border line is formed ahead of the front end of the actual vehicle.

6. The on-vehicle image pickup apparatus according to claim 4, wherein the illustration border line is formed behind the rear end of the actual vehicle.

7. The on-vehicle image pickup apparatus according to claim 4, wherein the illustration border line is formed outside the right and left sides of the actual vehicle.

8. The on-vehicle image pickup apparatus according to claim 4, wherein an illustration of the vehicle is formed in the area enclosed by the illustration border line.

9. The on-vehicle image pickup apparatus according to claim 4, wherein the image processing section performs a process of displaying the illustration border line with a variable position on the display screen.

10. The on-vehicle image pickup apparatus according to claim 4, wherein a portion of the illustration border line opposite to the side to which the vehicle is tilted is displayed at a position adjacent to the outline of the actual vehicle.

11. The on-vehicle image pickup apparatus according to claim 9, further comprising:

a speed monitoring section that monitors the speed of the vehicle, and wherein the image processing section performs a process of changing the position of the illustration border line according to the speed of the vehicle.

12. A method of an operating on-vehicle image pickup apparatus including a plurality of cameras disposed at a plurality of positions on a vehicle, the method comprising:

combining images of the surroundings of the vehicle taken by the cameras;

combining an illustration border line with the surrounding-area image, wherein the illustration border line extends outwardly beyond at least one portion of an image of the vehicle and the shape of the illustration border line is based on the outer shape of the at least one portion of the image of the vehicle, and the illustration border line is displayed outside an outline of the actual vehicle; and displaying the resulting image on a display screen, including detecting an inclination angle of the vehicle with respect to the horizontal and displaying a portion of the illustration border line at a side to which the vehicle is tilted at a position outside the outline of the actual vehicle by a first margin area having a first width, and displaying a portion of the illustration border line at a side opposite the side to which the vehicle is tilted at a position outside the outline of the actual vehicle by a second margin area having a second width less than the first width.

13. The method according to claim 12, wherein the illustration border line is formed ahead of the front end of the actual vehicle or behind the rear end of the actual vehicle.

14. The method according to claim 12, wherein the illustration border line is formed outside the right and left sides of the actual vehicle.

15. The method according to claim 12, wherein an illustration of the vehicle is formed in the area enclosed by the illustration border line.

16. The method according to claim 12, wherein the illustration border line is displayed with a variable position on the display screen.

17. The method according to claim 12, wherein a portion of the illustration border line opposite to the side to which the vehicle is tilted is displayed at a position adjacent to the outline of the actual vehicle.

18. The method according to claim 16, further comprising monitoring the speed of the vehicle, and changing the position of the illustration border line according to the speed of the vehicle.

* * * * *